United States Patent Office 2,948,979
Patented Aug. 16, 1960

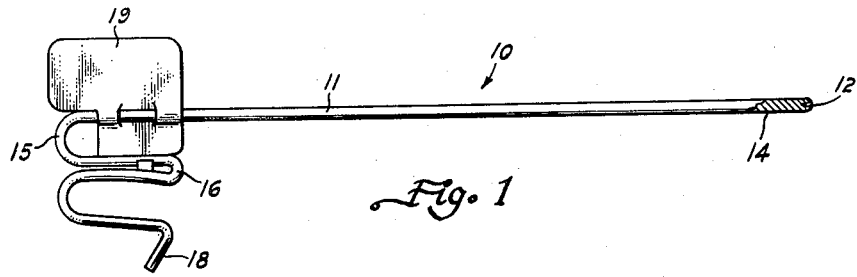
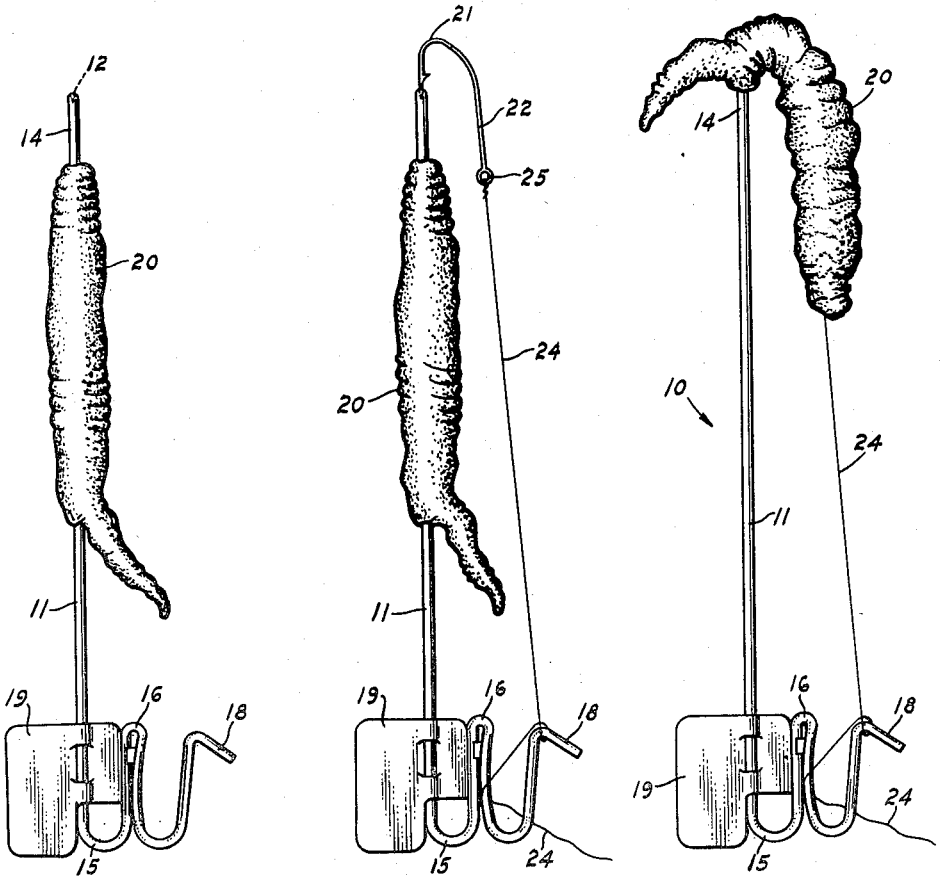

2,948,979

BAITING DEVICE

Harry W. Kulp, 1350 Quarry Lane, Lancaster, Pa.

Filed Aug. 18, 1959, Ser. No. 834,623

6 Claims. (Cl. 43—4)

This invention relates to a device for use in assisting a fisherman in mounting bait on a hook.

One object of the invention is to provide a device which will enable a fisherman to bait his fishhooks, large or small, with very little mess or effort.

Another object of this invention is to provide a baiting device having means thereon for holding the hook while it is being baited, there being no danger of the fisherman being stuck by the point of the hook.

Another and very important object of this invention is to provide a baiting device which eliminates mutilating the bait when it is being applied to the hook whereby more fish may be caught.

A further object of this invention is to provide a baiting device which will permit the fisherman to readily slide the bait onto the line or leader as well as onto the hook to provide a very secure application of the bait.

Other objects of the invention will be apparent hereafter from the specification and from the recital in the appended claims.

In the drawing:

Fig. 1 is a side elevation of a baiting device constructed according to this invention; and Figs. 2–4 illustrate the use of the device.

Referring now to the drawing by numerals of reference, and first to Fig. 1, 10 denotes the baiting device, as a whole, which comprises a needle 11 having an axial opening or recess 12 at a bait receiving end 14. As shown, end 14 is rounded, not pointed.

The opposite end 15 of needle 11 is bent upon itself to form a line-receiving U-shaped clamp 16 and a laterally projecting arm 18. Projecting laterally in the opposite direction from the end 15 of the needle, and suitably connected thereto, is a handle 19.

When used, the fisherman first slides the bait 20 onto the body of the needle, Fig. 2. The bait may be an earth worm, night crawler, blood worm, minnow, grub, grass hopper, cricket or the like. After the bait is in place the point of a hook 21 is stuck into opening 12 whereby the shank of the hook extends alongside the needle (Fig. 3). A line 24 connected to the eye 25 of the hook is drawn taut and wrapped once or twice around arm 18. Then the line is pressed into clamp 16, whereby it is releasably secured.

The tautness of line 24 exerts a continuous pull on hook 21 and thereby holds the hook point in the opening 12. With the bait, hook and line so disposed, the fisherman slides the bait off of needle 11 and onto the hook (Fig. 4). If desired the bait can be slid in part onto the line 24. Then, the line is released from clamp 16 and arm 18 whereupon the hook is freed from the needle.

The rounded end 14 makes it easy to slide the bait onto the needle without piercing the bait and releasing the juices which the fish are so fond of. Since the point of the hook 21 is in opening 12, there is no danger of the fisherman getting a finger pricked when the bait is applied to the hook. Further, the line 24, held at the opposite end of the needle, holds the hook in place. Thus the fisherman does not have to hold the hook, and the line is out of the way. One hand can hold the needle by means of handle 19 and the other hand is free to slide the bait off of the needle and onto the hook. When on the hook, a portion of the bait can be left to cover the point of the hook and provide a tail or dangling portion to lure the fish. This makes ideal bait for trolling or casting.

While this invention has been described in connection with a particular embodiment thereof, it will be understood that it is capable of modification without departing from the invention, and this application is intended to cover any variations, uses or adaptations of the invention which come within known or customary practice in the art to which the invention pertains or as fall with the scope of the invention or the limits of the appended claims.

Having thus described my invention what I claim is:

1. A device for baiting a hook on a fishing line comprising a needle having a bait receiving end, said end having an opening to receive the point of the hook, and means mounted on said needle at a position spaced axially from said one end for releasably clamping said line taut to thereby hold the hook point in said opening to facilitate the sliding of the bait from the needle to the hook.

2. A device for baiting a hook on a fishing line comprising a needle having a bait receiving end which is rounded, said end having an axial opening to receive the point of the hook, and means mounted on said needle at a position spaced axially from said one end for releasably clamping said line taut to thereby hold the hook point in said opening to facilitate the sliding of the bait from the needle to the hook.

3. A device for baiting a hook on a fishing line comprising a needle having a bait receiving end which is rounded, said end having an axial opening to receive the point of the hook, an arm projecting laterally from said needle at a position spaced axially from said one end and around which said line may be wrapped to draw it taut and thereby hold the hook point in said opening.

4. A device for baiting a hook on a fishing line comprising a needle having a bait receiving, rounded end, said end having a generally axially positioned opening to receive the point of the hook, said needle having an opposite end bent upon itself to form a clamp for releasably holding said line taut, and an arm projecting laterally from said clamp around which said line may be wrapped to insure against its pulling from said clamp.

5. A device for baiting a hook on a fishing line comprising a needle having a bait receiving, rounded end, said end having a generally axially positioned opening to receive the point of the hook, said needle having an opposite end bent upon itself to form a clamp for releasably holding said line taut, an arm projecting laterally from said clamp around which said line may be wrapped to insure against its pulling from said clamp, and a handle mounted on said opposite end, said clamp and arm projecting in one lateral direction from said needle and said handle projecting in the opposite direction.

6. A device for baiting a hook comprising a needle onto which the bait is adapted to be mounted by projecting one end of the needle through the bait, said one end being rounded and having an axial opening to receive the point of the hook whereby the bait may be readily slid from the needle and onto the hook.

References Cited in the file of this patent

UNITED STATES PATENTS 2,423,899     Odgard _____ July 15, 1947